May 3, 1949.                J. L. RUSSELL                2,469,005
               MAGNETOSTRICTIVE CONDITION-RESPONSIVE APPARATUS
                           Filed Feb. 8, 1947
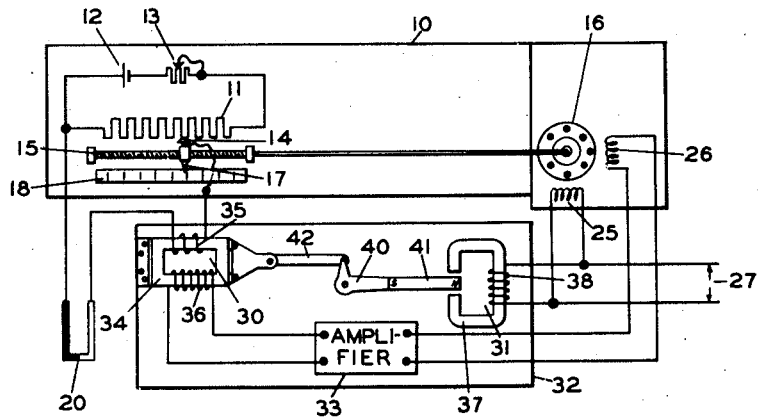
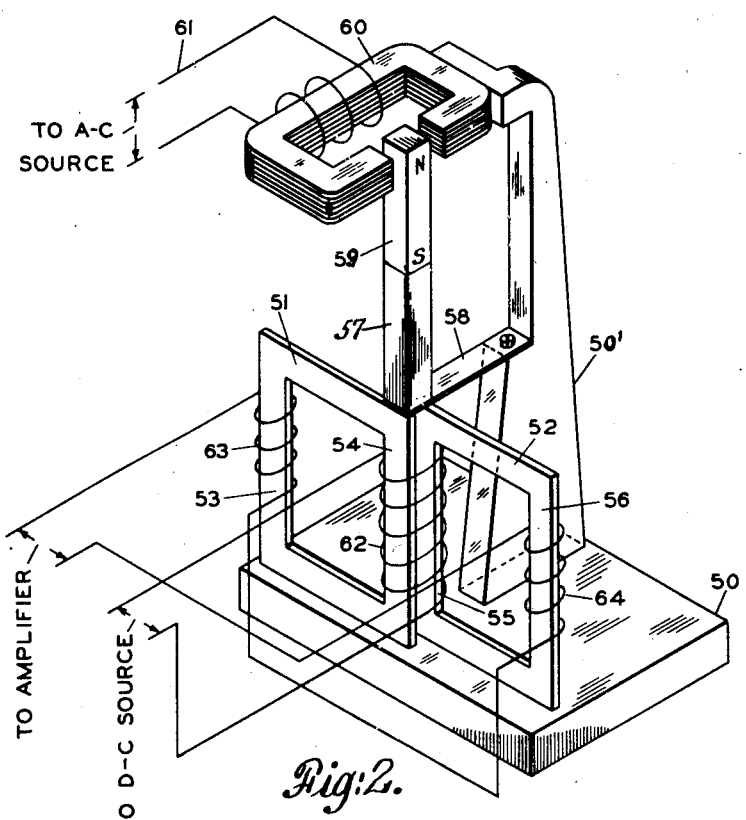
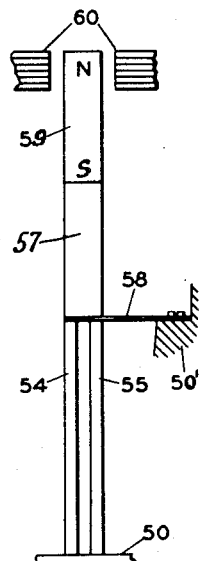
INVENTOR.
John L. Russell
BY
E. C. Sanborn
Attorney Patented May 3, 1949

2,469,005

UNITED STATES PATENT OFFICE 2,469,005

MAGNETOSTRICTIVE CONDITION-RESPONSIVE APPARATUS

John L. Russell, Waterbury, Conn., assignor to The Bristol Company, Waterbury, Conn., a corporation of Connecticut Application February 8, 1947, Serial No. 727,327

7 Claims. (Cl. 318—28)

This invention relates to a method and apparatus for determining the magnitude of a condition, and more especially to a method and apparatus whereby a very small change in the value of a direct current may be caused to control the magnitude of a relatively large alternating-current effect. In the measurement by electrical means of quantities not in themselves of an electrical nature, such as temperature and certain chemical effects, it is very often found expedient to translate the magnitude under measurement into a unidirectional electromotive force whose changes are representative of variations in said magnitude. In the performance of such measurements, especially where relatively small amounts of electrical energy are available, it generally becomes desirable to amplify variations for the purpose of providing useful indications, records, and control functions. It is a recognized fact that, while unidirectional effects may be amplified by means of electron tube systems, such methods of amplification are subject to many drawbacks and generally may not be carried out with the facility which characterizes the amplifications of alternating current magnitudes.

It is an object of this invention to provide means whereby very small changes in the value of a unidirectional current effect may be caused to produce corresponding changes in an alternating current effect, whereby the latter may be amplified and utilized in the performance of functions beyond the scope of the power level represented by the original unidirectional current variations. In accomplishing the purposes of the invention it is proposed to utilize that property of ferromagnetic materials known as magnetostriction, wherein a change of physical stress in the material effects a corresponding change in its magnetic permeability. This phenomenon has long been known, an early published reference to the subject being found in a paper by Matteucci appearing in Comptes Rendus in 1847. It is also fully discussed by J. A. Ewing in Magnetic Induction in Iron and Other Metals (about 1890). It has found considerable use in the determination of stresses and in the propagation and reception of sound signals.

In carrying out the present invention I provide an induction device having the general mechanical characteristics of a transformer and including a primary winding through which may be passed a unidirectional current representative of the magnitude under measurement, and a secondary winding adapted for connection to a suitable amplifying system, together with means for applying to the magnetic structure of said device a maintained condition of alternating stress, whereby the permeability of the magnetic circuit will be cyclically varied through a predetermined range of values. Thus, for any given magnetizing force derived from the primary winding, the flux passing through the magnetic system will have superimposed thereon a corresponding alternating variation, inducing in the secondary winding an electromotive force having a frequency determined by that of the cyclical stresses on the magnetic circuit, and a magnitude and phase dependent respectively upon the intensity and direction of the magnetizing force.

In the drawings:

Figure 1 is a diagrammatic representation of an instrument in which the principle of the invention is applied to the continuous balancing of a null-type measuring system.

Figure 2 is an isometric representation of an alternative form of the invention.

Figure 3 is a side elevation of certain parts of the apparatus shown in Fig. 2.

Referring now to the drawings:

In Figure 1 is shown a self-balancing potentiometer device adapted to the measurement of temperature, and subject to restoring influence derived from a detector-modulator element embodying the principle of the invention. Mounted upon a base member 10 is a slide wire 11 carrying a constant current derived from a battery 12 and adjusted to a predetermined value by a rheostat 13. The slide wire 11 is adapted to be traversed by a sliding contact 14 positioned by means of a lead screw 15 which may be driven in either direction by a reversible electric motor 16. An index or pointer 17, in cooperation with a graduated scale 18, provides a measure of the position of the sliding contact 14 with respect to the slide wire 11. In adaptation of the instrument to the measurement of temperature, a thermocouple 20 is exposed to the temperature to be determined, and, to the left hand end of the slide wire 11 (as seen in the drawing) one side of said couple is connected by means of a conductor 21. The other side of said couple is connected to the sliding contact 17 through a detector-modulator presently to be described. The motor 16 is preferably of the two-phase type having two mutually displaced windings 25 and 26. The winding 25 is continuously excited from an alternating source 27 whereby the magnetic system of said motor is continuously provided with an alternating field. The winding 26 is energized from the detector-modulator unit now to be described.

The detector-modulator unit includes a magnetostriction transducer 30 and an alternating magnet assembly 31, both mounted upon a common base 32, together with an amplifier 33. The detector-transducer unit 30 includes an extended core structure 34 formed of laminations of suitable ferro-magnetic material having pronounced magnetostrictive properties, secured at one extremity to the base 32, and carrying two insulated windings 35 and 36. The winding 35, which may be referred to as the "primary," is connected to the thermocouple 20 and to a flexible conductor 37, which, in turn, provides connection to the sliding contact 14 in the potentiometer assembly. The winding 36, which may be considered as the "secondary," is connected to the input side of the amplifier 33. The output side of said amplifier is connected to the winding 26 of the motor 16.

The magnet assembly 31 includes a core 38 (preferably of laminated construction) having thereon an exciting winding 39 which is connected to the source 27, whereby said core will be continuously subjected to alternating magnetization. Pivotally mounted upon the base 32 is a lever system 40 including a magnetically polarized armature 41 movably disposed within the air gap of the core 38, whereby, in response to the alternating flux from said core in said air gap, said armature will tend to vibrate synchronously with the excitation of the coil 39. The lever system 40, is mechanically attached, as by a link 42, to the free extremity of the core 34 in such a manner that, with vibration of said lever system in response to magnetic forces set up upon the polarized armature 41, a portion of said core will be subjected to alternating mechanical stresses, whereby its permeability will be cyclically varied in accordance with the hereinbefore mentioned principle of magnetostriction.

Consideration may now be given to the operation of the apparatus as thus far described. Upon alternating current being made available at the source 27, the winding 25 of the motor 16 will be energized, as will also the winding 39 upon the laminated core structure of the electromagnet 31. The alternating flux in which the polarized armature 41 is disposed, will act upon the same to cause said armature, together with the lever system 40 to vibrate synchronously with the alternating supply, and to subject portions of the core structure 34 in the transducer 30 to such alternating stresses as will produce a cyclical variation of permeability in the core material. Assuming a condition of balance between the electromotive force derived from the thermocouple 20 and that corresponding to the position of the sliding contact 14 with respect to the slide-wire 11, there will be no difference of potential between the terminals of the primary winding 35, and therefore no tendency for current to flow therein. Thus, there being no magnetomotive force in the core 34, the variation of permeability will not produce any cause for electromotive force to be induced in the secondary winding 36. Since no potential is applied to the input terminals of the amplifier 33, there will be no output voltage available for energizing the winding 26 in the motor 16. Thus, said motor will remain at rest, and there will be no tendency for the slider 14 to be translated along the slide wire 11.

It may now be assumed that there has been a change in the temperature to which the thermocouple 20 is exposed, so that there no longer exists a condition of balance between the thermocouple and that corresponding to the position of the sliding contact 14 on the slide wire 11. The differential electromotive force will be applied to the primary winding 35, and will cause a unidirectional current to flow therethrough, producing a magnetomotive force within the core 34. Since the permeability of said core is being subjected to a cyclical variation, it follows that the total magnetic flux passing therethrough, and linking with the secondary winding 36 will be similarly varied, and that there will be induced in said last named coil an electromotive force of frequency dependent upon the excitation of the magnet winding 39 (and therefore the same as that of the source 27) and of an intensity and phase position dependent upon the magnitude and polarity respectively of the unidirectional current flowing in the winding 35. The electromotive force derived from the secondary winding 36, after being suitably amplified in the amplifier 33, is impressed upon the winding 26 of the motor 16; and the corresponding current reacting with the flux produced by the winding 25, will tend to produce in said motor a rotative effort having a magnitude dependent upon the intensity of said secondary voltage, and a direction dependent upon its phase position. It will be understood that the amplifier 33 may, if necessary, include such phase-shifting means, well known in the art, as may be necessary to effect the desired quadrature relationship between the currents flowing in the respective motor windings 25 and 26, whereby said currents will produce the maximum torque upon the motor. By suitably selecting relative polarities, the ultimate relationship among voltages and currents may be made such that the motor 16 will at all times tend to rotate in a sense to translate the slider 14 along the slide wire 11 in such a direction as will reduce the difference between the thermocouple potential and the slide wire potential toward a zero value. As such value is attained, the position of the slider 14, as indicated by the reading of the index 17 upon the scale 18, will provide a measure of the electromotive force developed by the thermocouple 20, and therefore of the temperature to which said thermocouple is exposed.

In Figs. 2 and 3 is shown a form of the invention having an alternative form of transducer construction, whereby it is characterized by inherently higher sensitivity than is the form shown in Fig. 1. Two similar rectangular core structures 51 and 52, the former having parallel legs 53 and 54, and the latter parallel legs 55 and 56, and formed of ferromagnetic material suited to the purposes of the invention, are secured, each by one end to a mounting plate 50, the legs 54 and 55 of the cores 51 and 52 respectively being juxtaposed in a parallel, and slightly separated relationship, as will be clear by examination of Fig. 3, and the legs 53 and 56 disposed sufficiently far apart as to render negligible any magnetic interaction between their respective fields. It will be seen that the juxtaposed core legs with their interspace constitute a column of rectangular cross-section having an axis extending substantially perpendicular to the face of the mounting plate 50.

Extending from the column formed by the core legs 54 and 55, and substantially coaxial therewith, is a non-magnetic support 57 integrally attached to a perpendicularly projecting leaf spring member 58, and thereby to the free extremities of the legs 54 and 55. Carried by said support, and sufficiently separated thereby from the core legs 54 and 55 to eliminate magnetic interaction with the core structures 51 and 52, is a polarized armature 59. Said support 57, leaf spring 58, armature 59, and legs 54 and 55 may be united to each other in any suitable manner, as by welding. The extended extremity of the spring 58 is firmly secured to a bracket member 50', forming in turn an integral part of the base 50, and provides limited flexure whereby the armature 59 may vibrate through a small angle and in a sense that the juxtaposed core legs 54 and 55 will be alternately subjected to stresses of tension and compression. Embracing the free end of the armature 59 and separated therefrom by an appreciable air-gap is a laminated magnet core structure 60, rigidly mounted upon an extension of the bracket member 59, and carrying a winding 61 adapted to excitation from an alternating-current source.

Surrounding the juxtaposed leg portions 54 and 55 is a winding 62 adapted to be connected to a source of unidirectional current whose magnitude is to be measured or controlled. Wound upon the separated core legs 53 and 56 are individual but identical coils 63 and 64. Said last named coils are interconnected to form a continuous winding having two free terminals, the relative polarities being such that electromotive forces induced by magnetic fluxes passing in the same direction through the core legs 53 and 56, but simultaneously changing in opposite senses, will act additively in said winding, with the sum of their magnitudes appearing at its terminals.

In operation, the magnet winding 61 is excited from an alternating-current source, causing the polarized armature 59 to vibrate synchronously with the impressed voltage, and in turn to subject the core legs 54 and 55 to compressive and tensile stresses. As the upper extremity of the armature moves toward the left as seen in Fig. 3, the leg 54 will be compressed and the leg 55 placed in tension, and vice versa as the armature moves toward the right. Thus, as the permeability of one of said core legs is increased that of the other will be decreased. As a result, while the total reluctance of the magnetic circuit to be traversed by magnetic flux developed due to current in the coil 62 will be substantially unchanged, with a correspondingly constant relationship between flux and current in said coil, the distribution of said flux will be cyclically varied between the two core structures 51 and 52. Each of the coils 63 and 64 will thus have induced in it an alternating electromotive force; and, by virtue of the additive interconnection hereinbefore set forth, the sum of these voltages will be available at the terminals of their common circuit.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. In combination, means responsive to variations in a variable condition for causing a flow of direct current of intensity corresponding to said variations, a magneto-strictive core structure having a winding for receiving said current, means for subjecting said core structure to physical stresses varying through a regularly recurring range of magnitudes in cycles of substantially constant frequency to produce corresponding variations in the permeability of said core structure and thus in the magnetic flux produced in said structure by said direct current, said core structure also having a secondary winding in the path of said flux for the inducing therein of an alternating electromotive force of frequency corresponding to that of said flux and of magnitude and phase dependent upon the respective intensity and direction of said direct current.

2. In combination, means responsive to variations in a variable condition for causing a flow of direct current of intensity corresponding to said variations, a magnetostrictive core structure having a winding for receiving said current, means responsive to alternating current for subjecting said core structure to cyclically varying physical stresses to produce corresponding variations in the permeability thereof and thus in the magnetic flux produced in said structure by said direct current, said core structure also having a secondary winding in the path of said flux for the inducing therein of an alternating electromotive force of frequency corresponding to that of said flux and of magnitude and phase dependent upon the respective intensity and direction of said direct current.

3. In combination, means responsive to variations in a variable condition for causing a flow of direct current of intensity corresponding to said variations, a magnetostrictive structure comprising a pair of cores having adjacent leg portions separated by an intervening space, a winding for receiving said direct current and extending around both of said adjacent leg portions, each of said cores also including another leg portion joined to the first mentioned leg portion of said core by intervening core structure, means extending from said adjacent leg portions for concurrently placing one of said leg portions under compression and the other under tension to vary the permeability thereof, means for cyclically actuating said extending means to correspondingly vary said permeability and thereby the magnetic fluxes produced in said cores by said direct current, and secondary windings surrounding the second mentioned leg portions of said cores.

4. In combination, means responsive to variations in a variable condition for causing a flow of direct current of intensity corresponding to said variations, a magnetostrictive structure comprising a pair of cores having adjacent leg portions separated by an intervening space, a winding for receiving said direct current and extending around both of said adjacent leg portions, each of said cores also including another leg portion joined to the first mentioned leg portion of said core by intervening core structure, means extending from said adjacent leg portions for concurrently placing one of said leg portions under compression and the other under tension to vary the permeability thereof, means responsive to alternating current for cyclically actuating said extending means to correspondingly vary said permeability and thereby the magnetic fluxes produced in said cores by said direct current, and secondary windings surrounding the second mentioned leg portions of said cores.

5. Apparatus for measuring the magnitude of a variable condition, said apparatus comprising an electrical network, an electric motor, means controlled by said motor for balancing said network in response to unbalance thereof, means responsive to change in the magnitude of said condition for unbalancing said network to cause direct current of intensity and direction corresponding to said change to flow between certain points of said network, a magnetostrictive core structure having a winding connected between said points of said network for the flow of said direct current, means for subjecting said core structure to cyclically varying physical stresses to produce corresponding cyclical variations in the permeability thereof and thus in the magnetic flux produced in said structure by said direct current, said core structure also having a secondary winding in the path of said flux for the inducing therein of an alternating electromotive force of frequency corresponding to that of said flux and of magnitude and phase dependent upon the respective intensity and direction of said direct current, and means for applying said alternating electromotive force to the control of said motor.

6. Apparatus for measuring the magnitude of a variable condition, said apparatus comprising an electrical network, an electric motor, means controlled by said motor for balancing said network in response to unbalance thereof, means responsive to change in the magnitude of said condition for unbalancing said network to cause direct current of intensity and direction corresponding to said change to flow between certain points of said network, a magnetostrictive core structure having a winding connected between said points of said network for the flow of said direct current, means responsive to alternating current for subjecting said core structure to cyclically varying physical stresses to produce corresponding variations in the permeability thereof and thus in the magnetic flux produced in said structure by said direct current, said core structure also having a secondary winding in the path of said flux for the inducing therein of an alternating electromotive force of frequency corresponding to that of said flux and of magnitude and phase position dependent upon the respective intensity and direction of said direct current, and means for applying said alternating electromotive force to said control of said motor.

7. In combination, means responsive to variations in a variable condition for causing a flow of direct current of intensity corresponding to said variations, a magnetostrictive core structure having a winding for receiving said current, means for subjecting said core structure to cyclically varying physical stresses to produce corresponding variations in the permeability thereof and thus in the magnetic flux produced in said structure by said direct current, said core structure also having a secondary winding in the path of said flux for the inducing therein of an alternating electromotive force of frequency corresponding to that of said flux and of magnitude and phase dependent upon the respective intensity and direction of said direct current, an electric motor, connections between said motor and said secondary winding for causing operation of said motor in response to said alternating electromotive force, and means controlled by said motor for reducing said flow of direct current substantially to zero upon operation of said motor through an extent commensurate with said intensity of said current.

JOHN L. RUSSELL.

REFERENCES CITED

The following references are of record in the file of this patent:

UNITED STATES PATENTS

| Number | Name | Date |
| --- | --- | --- |
| 942,897 | Garrett et al. | Dec. 14, 1909 |